United States Patent Office 2,821,554
Patented Jan. 28, 1958

2,821,554

METHANE SULFENYL BROMIDES

Joseph N. Ospenson, Concord, Calif., assignor to California Spray-Chemical Corporation, Richmond, Va., a corporation of Delaware No Drawing. Application August 30, 1955
Serial No. 531,584

6 Claims. (Cl. 260—543)

This invention relates to a novel class of sulfenyl bromides which is susceptible of a variety of uses and particularly as an active component in toxicant compositions or as a reactant in the synthesis of further useful organic compounds.

It has been discovered that a series of novel sulfenyl bromides may be prepared by the reaction of a methane sulfenyl chloride with hydrobromic acid under a variety of conditions. These resulting sulfenyl bromides have been found useful both per se and as a primary reactant in the synthesis of organic compounds containing unique functional radicals. The sulfenyl bromides of this invention may be broadly classified as chloromethane sulfenyl bromides and in particular as compounds possessing the general formula:

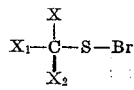

wherein X is chlorine, and $X_1$ and $X_2$ may be either hydrogen, chlorine and/or bromine.

Although the sulfenyl bromides may be prepared by reaction of the corresponding sulfenyl chlorides with hydrobromic acid and bromide salts in various media, the preferred method of preparation of the compounds of the invention is the reaction of a methane sulfenyl chloride, such as mono-, di-, or trichloromethane sulfenyl chloride, with concentrated aqueous hydrobromic acid at or below room temperatures. In this reaction, the bromine progressively replaces the chlorine in the molecule starting with the sulfenyl chlorine atom, and the reaction may be conveniently followed by specific gravity determination of the nonaqueous phase.

Depending upon the particular chloromethane sulfenyl chloride charged, the reaction product is generally a mixture of the chloromethane sulfenyl bromide and the various bromine-substituted chloromethane sulfenyl bromides or bromochloromethane sulfenyl bromides. The desired individual compounds may be extracted and isolated by pertinent processing techniques such as fractionation.

EXAMPLE 1

186 g. of 96% trichloromethane sulfenyl chloride (.96 mole) was added to 972 g. of 48% hydrobromic acid (6 moles) and agitated for 2 hours. At this point, the specific gravity of the nonaqueous phase was 2.2767. The red oil phase was then separated and 236.8 g. of reaction product was recovered, indicating a crude yield of 90 to 95% based on trichloromethane sulfenyl chloride charged.

The reaction product was then washed twice with water, dissolved in ether, and dried over anhydrous sodium sulfate, followed by filtering and stripping to a pot temperature of 65° C. at 25 mm. mercury. 200 g. of product was obtained with a specific gravity of 2.505. This product was then fractionated twice to yield pure trichloromethane sulfenyl bromide and monobromodichloromethane sulfenyl bromide.

The trichloromethane sulfenyl bromide was analyzed and possessed the following characteristics:

|   | Found, percent | Calculated, Percent |
|---|---|---|
| C | 5.41 | 5.22 |
| Cl | 46.3 | 46.2 |
| Br | 33.9 | 34.7 |
| S | 13.6 | 13.9 |

$n_D^{20} = 1.5842$
$d_4^{20} = 2.05$
Boiling point = 40.5° C. at 1.6 mm. mercury.

The monobromodichloromethane sulfenyl bromide analyzed as follows:

|   | Found, percent | Calculated, percent |
|---|---|---|
| C | 4.36 | 4.36 |
| Cl | 25.5 | 25.8 |
| Br | 57.8 | 58.2 |
| S | 11.50 | 11.65 |

$n_D^{20} = 1.6297$
$d_4^{20} = 2.38$
Boiling point = 46.6° C. at 1.1 mm. mercury.

EXAMPLE 2

37.2 g. of 96% trichloromethane sulfenyl chloride was added to 200 g. of 48% aqueous hydrobromic acid and agitated for 6 hours. The oily phase was separated and 200 g. of additional aqueous hydrobromic acid was added and agitated for another 6 hours, at which point the specific gravity of the nonaqueous phase was 2.82. The red oily phase was separated, indicating a yield of 80 to 85%.

The reaction product was then washed and dried as in the previous example and fractionated to yield dibromomonochloromethane sulfenyl bromide and tribromomethane sulfenyl bromide. The dibromomonochloromethane sulfenyl bromide was identified and resulted in the following analysis:

|   | Found, percent | Calculated, percent |
|---|---|---|
| C | 3.80 | 3.75 |
| Cl | 10.9 | 11.1 |
| Br | 74.5 | 75.2 |
| S | 10.06 | 10.0 |

$n_D^{20} = 1.6714$
$d_4^{20} = 2.67$
Boiling point = 55.8° C. at 0.6 mm. mercury.

EXAMPLE 3

Monochloromethane sulfenyl chloride was prepared according to Brintzinger, Chem. Ber. 83, pages 87–90 (1950). It was obtained as a yellow oil with a d 20/4 of 1.49 and a refractive index $n_D^{21}$ of 1.5385.

58.3 g. of the resulting compound was added slowly to 162 g. of 48% aqueous hydrobromic acid maintained at 5° to 10° C. with agitation. After 15 minutes' agitation at 15° to 18° C., the resulting immiscible, clear red oil phase was separated, washed twice with ice water, and dried over sodium sulfate. This was filtered and the clear red oil obtained deposited some crystals after 15 minutes. The mixture was cooled in a Dry Ice-acetone bath for one-half hour and filtered cold. The resulting crude monochloromethane sulfenyl bromide was obtained as a clear red filtrate and possessed a density of 1.89 and a refractive index $n_D^{27}$ of 1.600.

It was found that the compounds of the invention, namely the novel chloromethane sulfenyl bromides, possessed a remarkable degree of fungicidal activity, particularly against many soil fungi, aside from their merit as a synthesis intermediate or reactant for the preparation of compounds containing unique functional radicals. In order to illustrate the exceptional fungicidal activity of these compounds, representative chloromethane sulfenyl bromides were subjected to biological testing in accordance with the following described test procedure.

In these tests, filter paper disks were thoroughly infected with the test organism by leaving them for 24 hours in a vigorously growing broth culture. Each disk was then placed on standard potato-dextrose agar in Petri plates. The plates were then sprayed with the test compounds in a 50/50 kerosene-acetone solution at the desired concentration, employing an atomizer at 15 p. s. i. in a Hoskins-Caldwell chamber (Soap and Sanitary Chemicals, April 1947, pages 1–7). Large droplets of spray were removed and only a fine mist allowed to settle on the agar plates. Under these conditions, a uniform deposit of 0.5 milligram of spray per square centimeter was obtained. The runs were made in triplicate, and measurements were obtained as averages of 4 radii mycelial growth. The results obtained are tabulated in the following table in comparison with the results obtained on trichloromethane sulfenyl chloride.

Obviously, many modifications and variations of the invention as hereinbefore set forth may be made without departing from the spirit and scope thereof, and therefore only such limitations should be imposed as are indicated in the appended claims.

I claim:
1. A chloromethane sulfenyl bromide.
2. A compound of the formula:

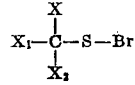

wherein X is chlorine, and $X_1$ and $X_2$ are members of the class consisting of hydrogen, chlorine, and bromine.
3. A bromochloromethane sulfenyl bromide.
4. Monobromodichloromethane sulfenyl bromide.
5. Dibromomonochloromethane sulfenyl bromide.
6. Trichloromethane sulfenyl bromide.

Table

| Compound | | Conc., Percent By Wt. | Percent control | | | |
|---|---|---|---|---|---|---|
| | | | Rhizoctonia solani | Fusarium oxysporum f. phaseoli | Sclerotinia sclerotiorum | Alternaria brassicae |
| Trichloromethane sulfenyl chloride | Cl–C(Cl)(Cl)–S–Cl | 0.25 / .125 | 8 / 5 | 5 / 2 | 28 / 11 | 9 / 2 |
| Trichloromethane sulfenyl bromide | Cl–C(Cl)(Cl)–S–Br | 0.25 / .125 | 100 / 100 | 100 / 100 | 100 / 100 | 100 / 100 |
| Dichlorobromomethane sulfenyl bromide | Br–C(Cl)(Cl)–S–Br | 0.25 / .125 | 100 / 100 | 100 / 100 | 100 / 100 | 100 / 100 |
| Chlorodibromomethane sulfenyl bromide | Cl–C(Br)(Br)–S–Br | 0.25 / .125 | 100 / 100 | 100 / 100 | 100 / 100 | 100 / 100 |

On the basis of these comparative results, it may be seen that the corresponding sulfenyl chloride gave no significant control, whereas the sulfenyl bromides gave complete control at both concentrations. Against two of the fungi, these sulfenyl bromides gave significantly greater control than an outstanding fungicide of commerce at the concentrations employed. Additionally, subculture work indicated that these compounds were fungicidal, even at 0.125% by weight, whereas a commercial fungicide was merely fungistatic.

References Cited in the file of this patent

UNITED STATES PATENTS 2,520,400   Himel et al. _____ Aug. 29, 1950

OTHER REFERENCES

Kharasch et al.: Chem. Rev., vol. 39, pgs. 269–332 (1946).

Fuson et al.: J. Org. Chem., vol. 11, pg. 471, (1946).

Schneider: Berichte, vol. 84, pgs. 911–16 (1951).